United States Patent [19]  [11] 4,297,442
Blahak  [45] Oct. 27, 1981

[54] CELLULAR ELASTOMERIC FOAMS AND METHOD OF PRODUCTION USING AN EXPANDING AGENT CONTAINING A COMPONENT REACTIVE WITH THE POLYAMINE CHAIN-LENGTHENING AGENT

[75] Inventor: Johannes Blahak, Gauting-Buchendorf, Fed. Rep. of Germany

[73] Assignee: Metzeler Kautschuk GmbH, Munich, Fed. Rep. of Germany

[21] Appl. No.: 163,732

[22] Filed: Jun. 27, 1980

[30] Foreign Application Priority Data

Jul. 13, 1979 [DE] Fed. Rep. of Germany ....... 2928357

[51] Int. Cl.³ ............................................. C08G 18/14
[52] U.S. Cl. .................................... 521/107; 521/110; 521/128; 521/130; 521/131; 521/159
[58] Field of Search .............. 521/107, 110, 128, 130, 521/131, 159

[56] References Cited

U.S. PATENT DOCUMENTS

| | | | |
|---|---|---|---|
| 3,222,302 | 12/1965 | Böllert et al. | 521/77 |
| 3,573,232 | 3/1971 | Kloker et al. | 521/130 |
| 3,975,316 | 8/1976 | Villa | 521/159 |
| 3,991,023 | 11/1976 | Blahak et al. | 521/159 |
| 4,070,310 | 1/1978 | Schneider et al. | 521/130 |

*Primary Examiner*—Maurice J. Welsh
*Attorney, Agent, or Firm*—Herbert L. Lerner; Laurence A. Greenberg

[57] ABSTRACT

Polyurethane elastomeric foam by foaming a prepolymer or polyisocyanates and compounds having at least two hydrogen atoms reactive to isocyanates, and a chain-lengthening polyamine agent, in the presence of an expanding agent containing a component reactive with the polyamine chain-lengthening agent or with the products of reaction thereof with polyisocyanates, and split-off gas.

12 Claims, 4 Drawing Figures

50 mm/min 600 mm/min

CELLULAR ELASTOMERIC FOAMS AND METHOD OF PRODUCTION USING AN EXPANDING AGENT CONTAINING A COMPONENT REACTIVE WITH THE POLYAMINE CHAIN-LENGTHENING AGENT

BACKGROUND OF THE INVENTION

1. Field of the Invention

The invention relates to novel open- and/or closed-cell elastomeric foams, and to a method for the production thereof.

2. Description of the Prior Art

It is known that polyurethane elastomers may be processed from polyols, 1,5-naphthylene diisocyanate, cross-linking agents, for example water, and/or expanding agents, into highly resilient elastomeric foams which can withstand impact loads, with compressions of up to 80%, without damage. For this reason, elastomeric foams of this kind, which can absorb heavy dynamic loads, are used in the construction of automotive vehicles, for example for impact-absorbers (mainly elastomeric foams of the Vulkollan (trade name) types).

It is also known that prepolymers made from polytetrahydrofuranepolyols, or mixtures thereof, and polyisocyanates, can be processed, in the presence or absence of catalysts and expanding agents with chain-lengthening agents, preferably polyamines (e.g. Moca ® and Caytur/7 ®), into elastomeric foams (of the Adiprene ® types).

Whereas elastomeric foams of the Vulkollan types absorb excessive amount of water, have low resistance to cold and hydrolysis, and must remain for relatively long periods of time in closed molds, elastomeric foams of the Adiprene ® types have inadequate resistance to oxygen and ozone and the polyamine chain-lengthening agents contained therein are toxic. Moreover, it is difficult to control their specific weight and cell-structure solely by means of expanding agents which vaporize or decompose under heat and which, because of their necessarily low decomposition point ($<100°$ C.), are explosive and, moreover, can be used only in the form of suspensions. Now if it is attempted, by reaction with isocyanate and water, to obtain carbon-dioxide as an additional expanding gas, this produces, in this system, hard segments, built up in various ways in the polymer matrix, which interfere with the highly distance-sensitive hydrogen-bridge formation in the hard segment, and this leads to a rapid decline in the levels of physical values.

SUMMARY OF THE INVENTION

It is therefore an object of the invention to provide novel elastomeric foams and methods for producing them which lack the defects of existing elastomeric foams and, more particularly, absorb less water, are more resistant to hydrolysis, and possess better low-temperature properties.

With the foregoing and other objects in view, there is provided in accordance with the invention an open- and/or closed-cell elastomeric foam which is characterized in that it is produced by foaming a polyurethane and/or polyurea prepolymer, adapted to be cross-linked with a polyamine, in the presence of an expanding agent, or mixture of expanding agents, containing, at least proportionally, a component forming a reactive gas with the polyamine chain-lengthening agent or with the products of the reaction thereof with polyisocyanates, in the presence of absence of substances catalyzing the formation of polyurea and/or surfactant substances and/or further additives, until the desired density is achieved.

Other features which are considered as characteristic for the invention are set forth in the appended claims.

Although the invention is illustrated and described herein as embodied in cellular elastomeric foams and method of production, it is nevertheless not intended to be limited to the details shown, since various modifications may be made therein without departing from the spirit of the invention and within the scope and range of equivalents of the claims.

BRIEF DESCRIPTION OF THE DRAWINGS

The invention, however, together with additional objects and advantages thereof will be best understood from the following description when read in connection with the accompanying drawings, in which.

DETAILED DESCRIPTION OF THE INVENTION

Figure 1:
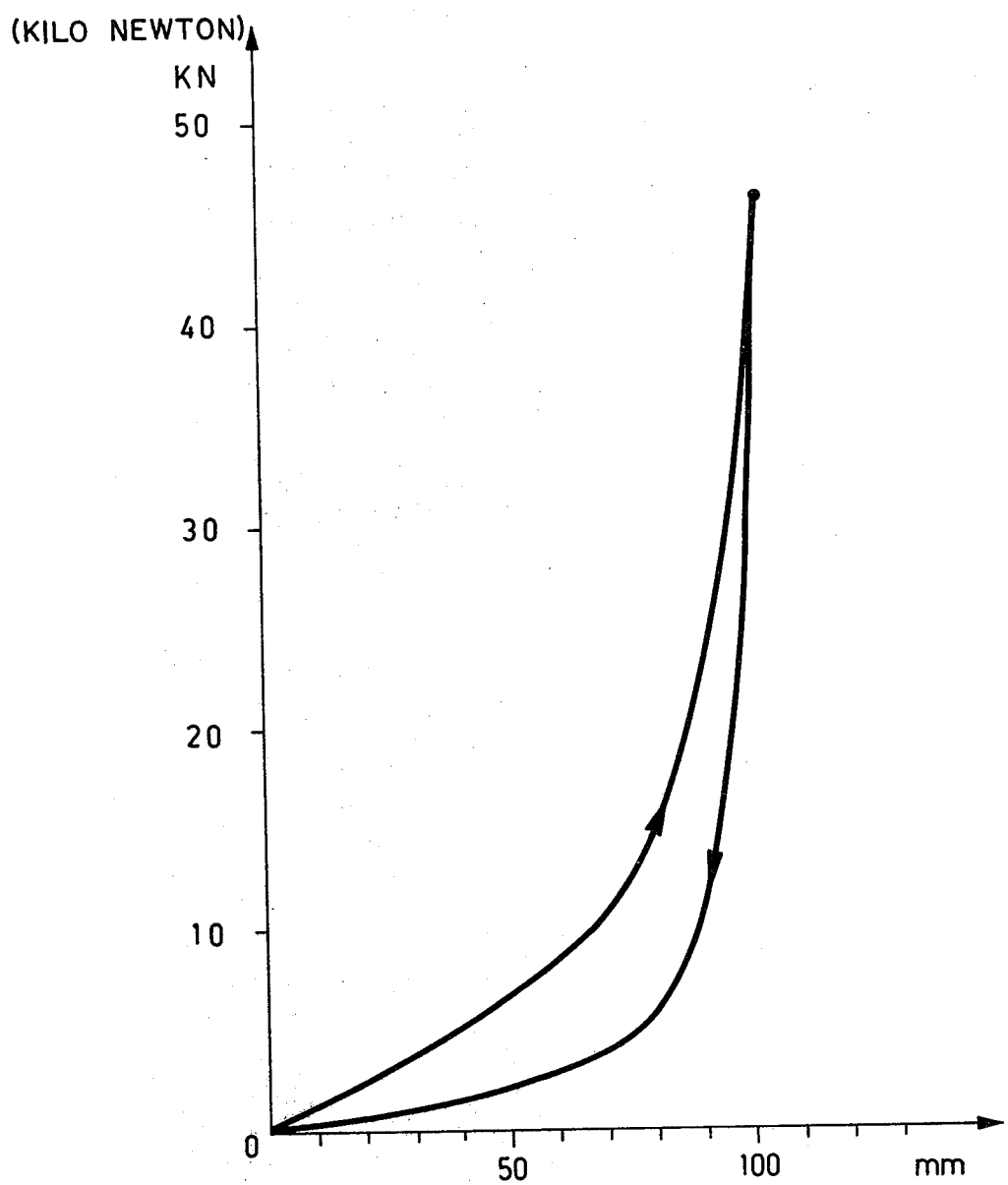
FIG. 1 is a force-travel diagram of an elastomeric structured foam produced in accordance with the invention to show its suitability as a spring-element protective body such as a bumper-override horn.

In accordance with the invention, an open- and/or closed-cell elastomeric foam which is characterized in that it is produced by foaming a polyurethane and/or polyurea polymer, adapted to be cross-linked with a polyamine, in the presence of an expanding agent, or mixture of expanding agents, containing, at least proportionally, a component forming a reactive gas with the polyamine chain-lengthening agent or with the products of the reaction thereof with polyisocyanates, in the presence or absence of substances catalyzing the formation of polyurea and/or surfactant substances and/or further additives, until the desired density is achieved.

An open- and/or closed-cell elastomeric foam of this type may be produced by a method which constitutes a further object of the invention and which is characterized in that a polyurethane and/or polyurea prepolymer, adapted to be cross-linked with a polyamine, is foamed—in the presence of an expanding agent or mixture of expanding agents, containing, at least proportionally, a component forming a reactive gas with the polyamine chain-lengthening agent, or with the products of the reaction thereof with polyisocyanates, in the presence or absence of substances catalyzing the formation of polyurea and/or surfactant substances and/or further additives—into a polyurethane or polyurea elastomeric foam of the desired density.

The novel open- and/or closed-cell elastomeric foams are excellent products having low water-absorption, satisfactory resistance to hydrolysis, and satisfactory low-temperature properties, far superior in these respects to existing elastomeric foams of the Vulkollan type. With appropriate additives, they may also be stabilized against $O_2/O_3$ ageing.

The surprising fact is that the expanding agent forming proportionally a reactive gas with the polyamine chain-lengthening agent, or reaction-products thereof, in no way impairs the mechanical values of the structured foams according to the invention, and that it is also possible to vary the density of the said foam, within wide limits, by its concentration. With commercial polypropyleneoxide polyols in particular, preferably made by the prepolymer process, and reactive low-melting-point polyamines, it is possible to obtain high-quality elastomeric foams. These foams do not require long mold-times and, as compared with foams of the Vulkollan and Adiprene ® types, the after-tempering time is considerably shorter.

The novel elastomeric structured foams according to the invention have a very wide variety of applications, for example for resilient elements, dynamically-loaded seals, sound-proofing, foam-filling of all kinds, for upholstery, cart tires, sandwich structure, e.g. structural elements, surf-boards and the like. Other preferred applications are for shoe-soles, inserts and parts hitherto made of foam-rubber.

The raw materials for the polyurethane and/or polyurea prepolymers used according to the invention are compounds having at least two hydrogen atoms reactive to isocyanates, generally of a molecular weight of between 400 and 10,000. This covers compounds comprising amino groups, thiol groups, and/or carboxyl groups, preferably polyhydroxyl compounds, in particular those having 2 to 8 hydroxyl groups, especially those having a molecular weight of 800 to 10,000, preferably 1,000 to 6,000, for example at least 2, usually from 2 to 8, preferably polyesters, polyethers, polythioethers, polyacetals, polycarbonates, polyester-amides comprising 2 to 4 hydroxyl groups, as known per se for the production of homogeneous, cellular polyurethanes.

Usable polyesters, comprising hydroxyl groups are, for example, the products of reactions between multivalent, preferably bivalent, and possibly also trivalent alcohols and multivalent, preferably bivalent carboxylic acids. Instead of free polycarboxylic acids, it is also possible to use the corresponding polycarboxylic-acid anhydrides or corresponding polycarboxylic-acid esters of lower alcohols, or mixtures thereof, for producing polyesters. The polycarboxylic acids may be of aliphatic, cycloaliphatic, aromatic and/or heterocyclic nature, and may, if necessary be substituted by halogen atoms, for example, and/or be unsaturated. Suitable examples are: succinic acid, adipic acid, suberic acid, azelaic acid, sebacic acid, phthalic acid, isophthalic acid, trimellitic acid, phthalic-acid anhydride, tetrachlorophthalic acid anhydride, endomethylene tetrahydrophthalic-acid anhydride, glutaric-acid anhydride, maleic acid, maleic-acid anhydride, fumaric acid, dimeric and trimeric fatty acids such as oleic acid, possibly in admixture with monomeric fatty acids, terephthalic-acid dimethyl ester, terephthalic-acid bisglycolic ester. Examples of usable multivalent alcohols are: ethylene glycol, propylene glycol-(1,2) and -(1,3), butylene glycol-(1,4) and -(2,3), hexane diol-(1,6), octane diol-(1,8), neopentyl glycol, cyclohexane dimethanol (1,4-bishydroxymethylcyclohexane), 2-methyl-1,3-propane diol, glycerine, trimethylol propane, hexane triol-(1,2,6), butane triol-(1,2,4), trimethylol ethane, pentaerythrite, chinite, mannite and sorbite, methyl glycosite, also diethylene glycol, triethylene glycol, tetraethylene glycol, polyethylene glycols, dipropylene glycol, polypropylene glycol, dibutylene glycol and polybutylene glycols. The polyesters may comprise carboxylic groups arising proportionally. Also usable are polyesters made of lactones, for example $\epsilon$-caprolactone or hydroxycarboxylic acids such as $\omega$-hydroxycaproic acid.

The polyethers usable according to the invention, comprising at least 2, usually 2 to 8, preferably 3 to 8 hydroxyl groups, are types known per se and are produced, for example, by polymerizing epoxies, such as ethylene oxide, propylene oxide, butylene oxide, tetrahydrofurane, styrene oxide or epichlorhydrin, with themselves, for example in the presence of $BF_3$, or by adding these epoxies, in admixture or consecutively, to trigger components with reactive hydrogen atoms such as alcohols or amines, e.g. water, ethylene glycol, propylene glycol-(1,3) or -(1,2), trimethylol propane, 4,4'-dihydroxydiphenyl propane, aniline, ammonia, ethanolamine, ethylene diamine. It is also known to use saccharose polyethers as described, for example in German Published Prosecuted Applications No. 1 176 358 and No. 1 064 938. Often preferred are polyethers containing predominantly primary OH groups (up to 90% by weight in relation to all OH groups present in the polyether). Also useable are polyethers comprising OH groups modified with vinyl polymers, as obtained, for example, by polymerizing styrene, or acrylonitrile in the presence of polyethers (U.S. Pat. Nos. 3,383,351, 3,304,273, 3,523,093, 3,110,695 and German Pat. No. 1 152 536), as well as polybutadienes.

Examples of useable polythioethers are, in particular, the products of condensing thiodiglycol with itself and/or with other glycols, dicarboxylic acids, formaldehyde, aminocarboxylic acids or amino alcohols. Depending upon the co-components, these products are polythio-mixed ethers, polythioether esters and polythioetherester amides.

The polyacetals may be, for example, compounds obtained from glycols such as diethylene glycol, triethylene glycol, 4,4'-dioxyethoxydiphenyldimethyl methane, hexane diol and formaldehyde. According to the invention, suitable polyacetals may also be obtained by polymerizing cyclic acetals.

Examples of usable polycarbonates comprising hydroxyl groups are those known per se, e.g. those which may be produced by reacting diols, such as propane diol-(1,3), butane diol-(1,4) and/or hexane diol-(1,6), diethylene glycol, triethylene glycol and tetraethylene glycol with diaryl carbonates such as diphenyl carbonate or phosgene.

Among polyester amides and polyamides usable according to the invention are, for example, those obtained from multivalent, saturated and unsaturated carboxylic acids and anhydrides thereof and multivalent, saturated and unsaturated aminoalcohols, diamines, polyamines and mixtures thereof, mainly linear condensates.

It is also possible to use polyhydroxyl compounds containing urethane or urea groups and, possibly, modified natural polyols such as castor oil carbohydrates and starches. Also usable, according to the invention, are addition-products of alkylene oxides to phenol-formaldehyde resins or to urea-formaldehyde resins.

Representatives of the compound usable according to the invention are described, for example, in "High Polymers", volume XVI, "Polyurethanes, Chemistry and Technology", edited by Saunders-Frisch, Interscience Publishers, New York, London, volume 1, 1962, pages 32–42 and 44–54, and volume II, 1964, pages 5–6 and 198–199; and in the "Kunststoff Handbuch", volume VII, Vieweg-Höchtlen, Carl-Hanser Verlag, Munich 1966, on pages 45 to 71, for example.

In producing the polyurethane and/or polyurea prepolymers usable according to the invention, other possible initial components are aliphatic and heterocyclic polyisocyanates are described, for example, by W. SIEFGEN in "Justus Liebigs Annalen der Chemie", 562, pages 75 to 136, e.g. ethylene diisocyanate, 1,4-tetramethylene diisocyanate, 1,6-hexamethylene diisocyanate, 1,12-dodecane diisocyanate, cyclobutane-1,3 diisocyanate, cyclohexane-1,13 and 1,4 diisocyanate, and any desired mixtures of these isomers, 1-isocyanate-3,35-trimethyl-5-isocyanatomethylcyclohexane (German AS 1 202 785), 2,4- and 2,6-hexahydrotoluylene diisocyanate, and any desired mixtures of these isomers, hexahydro-1,3 and/or -1,4-phenylene diisocyanate, perhydro-2,4- and/or -4,4'-diphenylmethane diisocyanate, 1,3- and 1,4-phenylene diisocyanate, 2,4- and 2,6-toluylene diisocyanate, and any desired mixtures of these isomers, diphenyl methane-2,4'- and/or -4,4'-diisocyanate, naphthylene-1,5 diisocyanate, triphenyl methane-4,4', 4''-triisocyanate, polyphenyl-polymethylene-polyisocyanate, as obtained by aniline-formaldehyde condensation and subsequent phosgenizing and described, for example, in British Pat. Nos. 874,430 and 848,671, perchlorinated arylpolyisocyanate, as described, for example in German AS 1 157 601, polyisocyanates comprising carbodiimide groups, as described in German Pat. No. 1 092 007, diisocyanates as described in U.S. Pat. No. 3,492,330, polyisocyanates comprising allophanate groups as described, for example, in British Pat. No. 994,890, in Belgian Pat. No. 761,626, and in Dutch OS 71 02 524, polyisocyanates comprising isocyanurate groups as described, for example, in German Pat. Nos. 1 022 789, 1 222 067 and 1 027 394 and in German OS 1 929 034 and 2 004 048, polyisocyanates and comprising urethane groups as described in Belgian Pat. No. 752 261 and in U.S. Pat. No. 3,394,164, polyisocyanates comprising acylated urea groups as described in German Pat. No. 1 230 778, polyisocyanates comprising biuret groups as described for example, in German Pat. No. 1 101 394, in British Pat. No. 889,050, and in French Pat. No. 7 017 514, polyisocyanates produced by telomerization reactions as described, for example, in Belgian Pat. No. 723 640, polyisocyanates comprising ester groups as described, for example, in British Pat. Nos. 956,474 and 1,072,956, in U.S. Pat. No. 3,567,763 and in German Pat. No. 1 231 688, as well as products of the reaction of the above-mentioned isocyanates and acetals, as described in German Pat. No. 1 072 385.

It is also possible to use distillation residues comprising isocyanate groups occurring during the industrial production of isocyanate, possibly dissolved in one or more of the afore-said polyisocyanates, and any desired mixtures thereof.

Special preference is given, as a rule, to the use of polyisocyanates easily available industrially, such as 2,4- and 2,6-toluylene diisocyanate and any desired mixtures of these isomers (TDI), polyphenyl polymethylene-polyisocyanate, as obtained by aniline-formaldehyde condensation and subsequent phosgenizing ("crude MDI"), and polyisocyanates comprising carbodiimide groups, urethane groups, allophanate groups, isocyanurate groups, urea groups and/or biuret groups (modified polyisocyanates).

The polyurethane and/or polyurea prepolymers used according to the invention may be produced, by using the above-mentioned initial compounds by single-stage processes known per se, the prepolymer process or the semiprepolymer process, more particularly by the "one-shot" process, in which mechanical apparatuses are frequently used, such as are described, for example, in U.S. Pat. No. 2,764,565. Details of the processing equipment, also usable according to the invention, may be found in the "Kunststoff Handbuch", volume VI, edited By Vieweg and Höchtlen, Carl-Hanser Verlag, Munich, 1966, on pages 121 to 205, for example.

Example of suitable organic expanding agents are acetone, ethyl acetate, methanol, ethanol, halogen-substituted alkanes such as methylene chloride, chloroform, ethylene dichloride, vinylidene chloride, monofluorotrichloromethane, chlorodifluoro-methane, dichlorodifluoro-methane, and butane, hexane, heptane and diethyl ether. An expanding effect may also be obtained by the addition of compounds which decompose at temperatures above room temperatures and split off gases such as nitrogen, for example, azo compounds such as azoisobutyric-acid nitrile. Further examples of suitable expanding agents, and details of the use thereof, are given in the "Kunststoff Handbuch" volume VII, edited by Vieweg and Höchtlen, Carl Hanser Verlag, Munich 1966, on pages 108 and 109, 453 to 455, and 507 to 510, for example. Moreover, special preference is given to expanding agents which react with aminic chain lengtheners, or with the products of the reaction thereof with polyisocyanates, and split off gas, or mixtures thereof with the above-mentioned expanding agents, for example dicarbonic-acid dialkyl esters, alkyl carbaminates and Leusche anhydrides.

Examples of polyamines usable according to the invention as cross-linking and chain-lengthening agents are bisethoxylated toluylene diamine, 4-methyl-3,5-diamino-benzoic-acid ethyl ester, and a mixed condensate of 2,6-diethyl- and 2,6-diisopropyl aniline and formaldehyde, or polyamines of similar $pK_B$ value.

According to the invention, catalysts used for urea formation may be those known per se, for example tertiary amines such as triethyl amine, tributyl amine, N-methyl morpholine, N-ethyl morpholine, N-coco morpholine, N,N,N'-tetramethyl ethylene diamine, 1,4-diazo-bicyclo [2.2.2] octane, N-methyl-N'-dimethylaminoethyl piperazine, N,N-diethyl benzylamine, pentamethyldiethylene triamine, N,N-dimethylcyclohexyl amine, N,N,N',N'-tetramethyl-1,3-butane diamine, N,N-dimethyl-β-phenylethyl amine, 1,2-dimethylimidazol and 2-methyl imidazol. Special mention must also be made of acid catalysts for forming polyurea, e.g. adipic acid, alkyl benzoic acids and dialkyl phosphates.

Examples of tertiary amines which comprise hydrogen atoms and are capable of reacting with isocyanate groups are triethanolamine, triisopropanolamine, N-methyl diethanolamine, N-ethyl diethanolamine, N,N-dimethyl ethanolamine and the products of the reaction thereof with alkylene oxides such as propylene oxide and/or ethylene oxide.

It is also possible to use as catalysts siloamines with carbon-silicon bonds as described, for example, in German Pat. No. 1 229 290. Suitable examples are 2,2,4-trimethyl-2-silamorpholine and 1,3-diethyl aminomethyl tetramethyl disiloxane.

Also usable as catalysts are nitrogen-containing bases such as tetraalkyl ammonium hydroxides, and alkali hydroxides such as sodium hydroxide, alkali phenolates such as sodium phenolate or alkali alcoholates such as sodium methylate. Hexahydrotriazines may also be used as catalysts. Organic metal compounds, especially organic tin compounds, may be used as catalysts. Preferred examples of organic tin compounds usable according to the invention are stannous (tin II) salts of carboxylic acids such as stannous acetate, stannous octoate, stannous ethyl hexoate and stannous laurate, and the dialkyl tin salts of carboxylic acids such as dibutyl tin diacetate, dibutyl tin laurate, dibutyl tin maleate and dioctyl tin diacetate.

Further examples of catalysts usable according to the invention, together with details of how the said catalysts work, may be found in the "Kunststoff Handbuch" volume VII, edited by Vieweg and Höchtlen, Carl Hanser Verlag, Munich 1966, on pages 96 to 102, for example.

As a rule the catalysts are used in amounts of between 0.001 and 10% by weight, in relation to the amount of compounds having at least two hydrogen atoms, capable of reacting with isocyanates, and a molecular weight of 400 to 10,000.

If desired, the products according to the invention may also contain surfactant additives, e.g. emulsifiers and foam stabilizers. Examples of usable emulsifiers are sodium salts of ricinoleic sulphonates or of fatty acids, or salts of fatty acids with amines such as oleic-acid diethylamine or stearic-acid diethanolamine. It is also possible to use alkali and ammonium salts of sulphonic acids such as dodecyl-benzenesulphonic acid and dinaphthylmethane disulphonic acids, or also of fatty acids such as ricinoleic acid, or of polymeric fatty acids, as surfactant additives.

Examples of foam stabilizers usable according to the invention are water-soluble polyether siloxanes in particular. The structure of these compounds is generally such that a copolymer of ethylene oxide and propylene oxide is attached to a polydimethyl siloxane radical. Foam stabilizer of this kind are described in U.S. Pat. No. 2,764,565, for example.

According to the invention, it is also possible to make use of reaction-retardants, for example acid-reacting substances such as hydrochloric acid or organic acid halides; also cell controllers of a type known per se such as paraffins, fatty alcohols, or dimethylpolysiloxanes; also pigments, dyes or flame-proofing agents of a type known per se, for example trischlorethyl phosphate or ammonium phosphate and polyphosphate; also stabilizers against ageing and weathering effects, plasticizers and fungistatic and bacteriostatic substances, and filler such as barium sulphate, kieselguhr, carbon black and whitening.

Additional examples of surfactant substances and foam stabilizers usable according to the invention, as well as cell controllers, reaction retardants, stabilizers, flame-retardants, plasticizers, dyestuffs and fillers, and substances having fungistatic and bacteriostatic properties, together with details of the use of these additives and their methods of operation, may be found in the "Kunststoff Handbuch", volume VI, published by Vieweg and Höchtlen, Carl Hanser Verlag, Munich 1966, on pages 103 to 113, for example.

The invention is explained in greater detail with the following examples, but it is not restricted thereto. Unless otherwise indicated, parts mentioned therein are parts by weight.

EXAMPLE 1

80 Parts of a prepolymer mixture based upon polypropylene-oxide polyols and 2,4- and 2,6 toluyene diisocyanates (isomer ratio: 65% 2,4-isomer and 35% 2,6-isomer) with 4.8% by weight of free NCO, are homogenized at 55° C. with 1.6 parts of dicarbonic acid diethyl ester, within 5 seconds, using a high-speed stirrer. Thereafter, 10 parts of bisethoxylated toluylene diamine are added at this temperature, homogenizing being carried out for 10 seconds. The product is then cast in a closable mold also heated to 55° C.

| | |
|---|---|
| System starting time: | about 20 s(seconds) |
| Setting time | 2m(minutes) |
| Postheating time after removal from mold: | 12h(hours) at 80° C. |
| $V_{form}$ | 176 cm$^3$ |
| $G_{foam}$ | 83 p |
| $\rho_{foam}$ | 0.47 g/cm$^3$ |

When compressed to 80% and released, the foam absorbs, under water, less than 5% by weight of water. It withstands repeated compression to 80% almost without permanent deformation.

EXAMPLE 2

The procedure is as in Example 1, but using 93.8 parts of the prepolymer, 1.8 parts of dicarbonic acid diethyl ester and 11.7 parts of the same polyamine chain-lengthening agent as in Example 1.

| | |
|---|---|
| $\rho$foam | 0.54 g/cm$^3$ |
| water absorption | 1% by weight |
| contraction value | 1.3% |

This elastomeric foam also withstands repeated compression to 80% without substantial permanent deformation.

EXAMPLE 3

The procedure is as in Example 1, but using the equivalent amount of 4-methyl-3,5-diamino-2-methylhexyl ester as the polyamine chain-lengthening agent. This produces an elastomeric foam having a density $\rho$ of 0.49 g/cm$^3$.

The compressive hardness of this elastomeric foam is higher than that given in Example 1 and it also withstands repeated compression to 80% without substantial permanent deformation.

EXAMPLE 4

Figure 2:
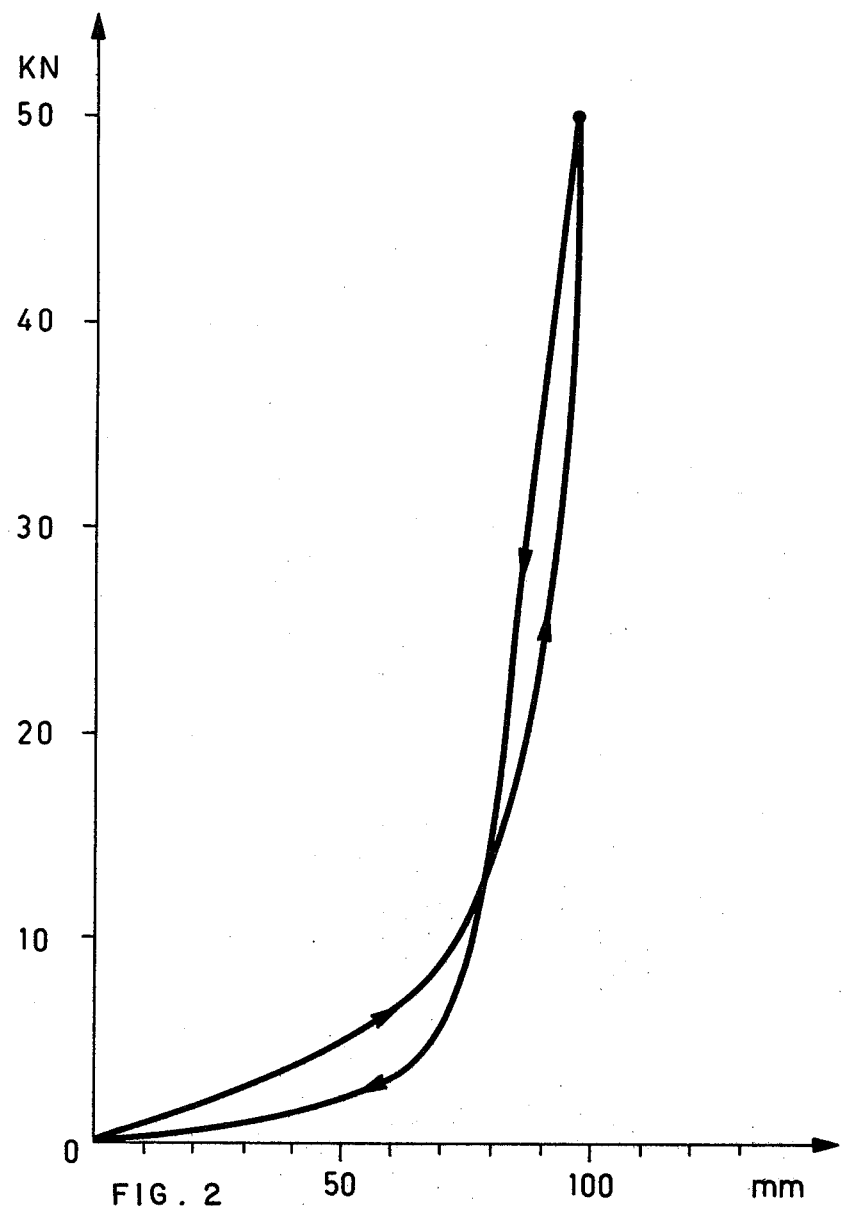
FIG. 2 is similar to FIG. 1 except for an increased compression velocity of 600 mm/minute as compared to 50 mm/minute in FIG. 1.

For the purpose of producing a spring-element body, 800 g of a prepolymer according to Example 1, 16 g of dicarbonic acid diethyl ester, and 100 g of bisethoxylated toluylene-,4-diamine, as in Example 1, are mixed together and are cast into a mold in the form of a bumper-over-ride horn. This produces an elastomeric structure foam having a density of 0.47 g/cm$^3$. Complete restoration is shown in force-travel diagrams in FIGS. 1 and 2 which show, over a force-range of 0 to 50 KN, the deformation in mm, using a compression velocity of 50 mm/m and 600 mm/m.

EXAMPLE 5

Figure 3:
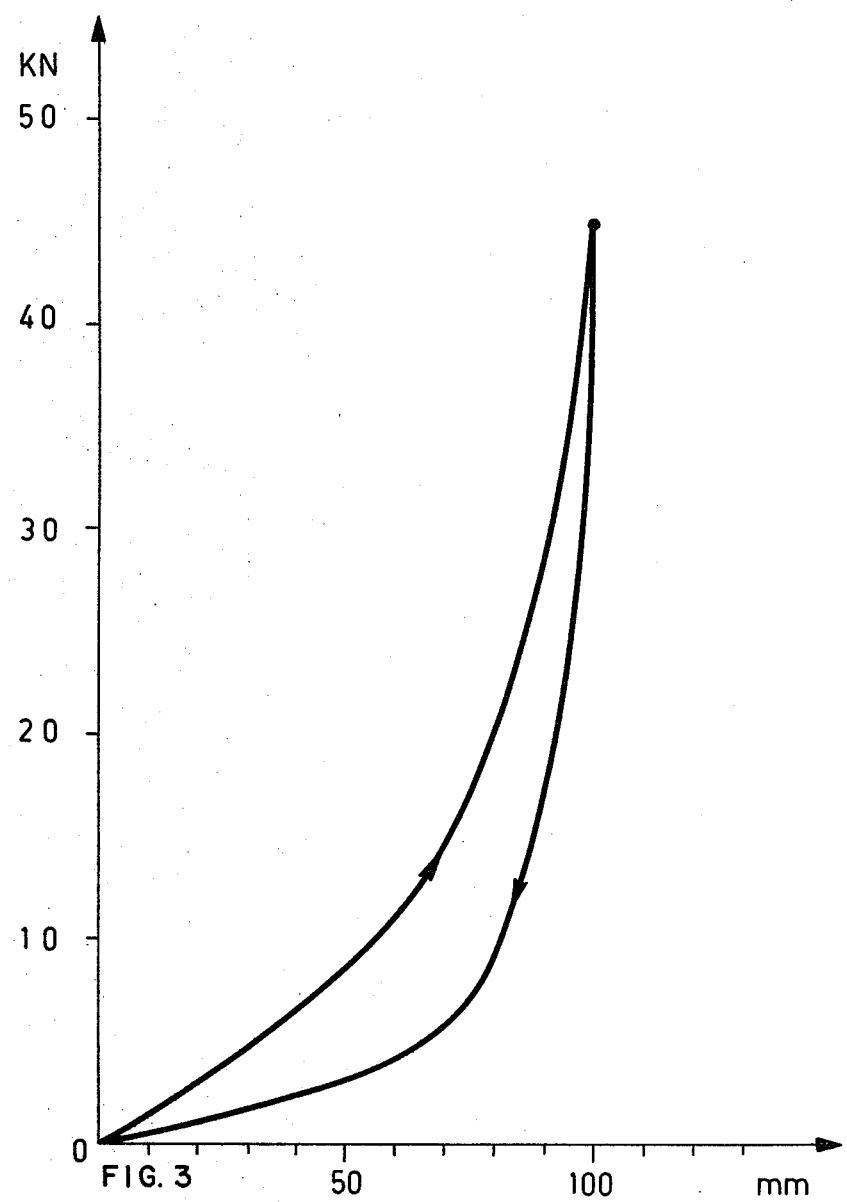
FIG. 3 and FIG. 4 are force-travel diagrams corresponding to FIGS. 1 and 2 illustrating the restoration effect for another, denser elastomeric foam made in accordance with the invention.
Figure 4:
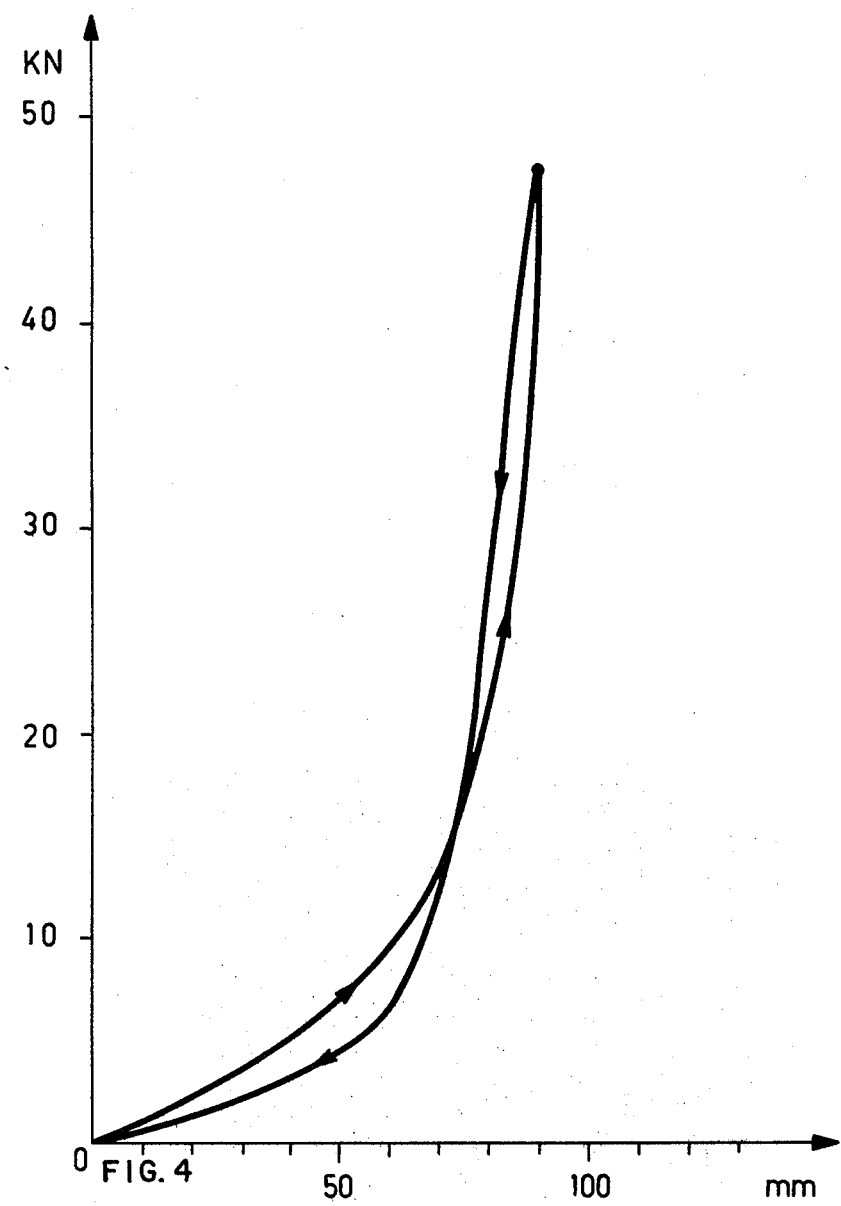

938 g of a prepolymer according to Example 1, 18 g of dicarbonic acid diethyl ester, and 117.4 g of a polyamine chain-lengthening agent according to Example 4, are processed as in Examples 1 and 4. This produces an elastomeric structured foam having a density of 0.54 g/cm$^3$. Complete restoration is shown in force-travel diagrams in FIGS. 3 and 4 (corresponding to diagrams in FIGS. 1 and 2).

EXAMPLE 6

The procedure is as in Example 4, but using 154.5 g of a polyamine chain-lengthening agent produced by mixed condensation of 2,6-diethyl- and 2,6-diisopropyl aniline with formaldehyde. This produces an elastomeric structured foam having a density of 0.48 g/cm$^3$ which also has an almost ideal restoration capacity.

EXAMPLE 7

The structured foam system according to Example 1 is compressed under water (to 20% of the initial volume) and is then released under water. It is weighed after removal from the water. This makes it possible to determine the amount of water absorbed as a function of density.

| Hollow cylindrical shape (g/cm$^3$) $\rho_{elastomeric foam}$ | 363 ml g H$_2$O mold part |
|---|---|
| 0.415 | 66 |
| 0.459 | 6 |
| 0.503 | 1 |
| 0.557 | 1 |
| 0.595 | 1 |

The foregoing data indicate the small amount of water absorbed by the elastomeric foam according to the invention at low density.

EXAMPLE 8

The elastomeric foam system according to Example 1 may be varied without any substantial decrease in mechanical values and the congealing temperatures (determined by using the oscillation-torsion test according to DIN 53455) may be adjusted by the average molecular weights of the polypropylene-oxide polyols and mixtures thereof:

| $\overline{M}$ g/2 Mol OH | Glass temperature (°C.) |
|---|---|
| 1400 | −31 |
| 1600 | −37 |
| 1900 | −46 |

The foregoing data indicate the satisfactory low-temperature behavior of the structured elastomeric foam according to the invention.

Although the invention has been explained hereinbefore in greater detail in connection with preferred examples of embodiment, it will be obvious to one skilled in the art that it is by no means restricted thereto, but may be altered and modified in many respects, without thereby departing from the scope of the invention.

There are claimed:

1. Cellular elastomeric foams produced by foaming a polyurethane or a polyurethane prepolymer and cross-linked with a polyamine-chain lengthening agent in the presence of an organic expanding agent containing at least in part a gas-forming component, which reacts with the polyamine chain-lengthening agent or with the products of reaction thereof with polyisocyanates.

2. Method for the production of cellular elastomeric foams by foaming a polyurethane or a polyurethane prepolymer cross-linked with a polyamine-chain lengthening agent in the presence of an organic expanding agent containing at least in part a gas-forming component, which reacts with the polyamine chain-lengthening agent or with the products of reaction thereof with polyisocyanates.

3. Method according to claim 2, wherein the polyamine chain-lengthening agent is bisethoxylated toluylene diamine.

4. Method according to claim 2, wherein the polyamine chain-lengthening agent is a 4-methyl 3, diaminobenzoic-acid ester.

5. Method according to claim 2, wherein the polyamine chain-lengthening agent is a mixed condensate of 2,6-diethyl and 2,6 diisopropyl aniline with formaldehyde.

6. Method according to claim 2, wherein the polyamine chain-lengthening agent with the prepolymer alone at 55° C. has a reaction time of <30 seconds and a mold removal time of <3 minutes.

7. Method according to claim 6, wherein the reaction time is <20 seconds and the mold removal time is <2 minutes.

8. Method according to claim 2, wherein the gas-forming component is a dicarbonic acid dialkyl ester.

9. Method according to claim 8, wherein the gas-forming component is a dicarbonic acid diethyl ester.

10. Method according to claim 2, wherein the gas-forming component is isatoic acid anhydride suspended in the prepolymer.

11. Method according to claim 2, wherein the gas-forming component is formic acid or an aqueous solution of formic acid.

12. Method according to claim 2, wherein the gas-forming component is carbaminate.

* * * * *